(12) United States Patent
Korge et al.

(10) Patent No.: US 12,244,629 B2
(45) Date of Patent: Mar. 4, 2025

(54) SYSTEMS AND METHODS FOR APPLYING REINFORCEMENT LEARNING TO CYBERSECURITY GRAPHS

(71) Applicant: Reveald Holdings, Inc., New York, NY (US)

(72) Inventors: James Korge, Brooklyn, NY (US); Damion Irving, Brooklyn, NY (US); Jeffrey L. Thomas, Columbus, OH (US); Donald Bathurst, Denver, CO (US)

(73) Assignee: Reveald Holdings, Inc., New York, NY (US)

( * ) Notice: Subject to any disclaimer, the term of this patent is extended or adjusted under 35 U.S.C. 154(b) by 218 days.

(21) Appl. No.: 17/816,009

(22) Filed: Jul. 29, 2022

(65) Prior Publication Data

US 2023/0034303 A1    Feb. 2, 2023

Related U.S. Application Data

(60) Provisional application No. 63/227,963, filed on Jul. 30, 2021.

(51) Int. Cl.
| | | |
|---|---|---|
| *H04L 29/08* | (2006.01) | |
| *G06F 16/25* | (2019.01) | |
| *G06F 16/901* | (2019.01) | |
| *G06F 16/953* | (2019.01) | |
| *H04L 9/40* | (2022.01) | |
| *H04L 12/26* | (2006.01) | |
| *H04L 12/58* | (2006.01) | |

(52) U.S. Cl.
CPC .................... *H04L 63/1433* (2013.01)

(58) Field of Classification Search
CPC ... H04L 63/1433; H04L 63/145; G06N 3/006; G06N 3/04; G06N 3/092; G06N 3/098

USPC ............................................. 726/22; 729/25
See application file for complete search history.

(56) References Cited

U.S. PATENT DOCUMENTS

| | | |
|---|---|---|
| 8,881,288 B1 | 11/2014 | Levy et al. |
| 10,033,754 B2 | 7/2018 | Pinney Wood et al. |
| 10,084,822 B2 | 9/2018 | Papamartzivanos et al. |
| 10,425,429 B2 | 9/2019 | Bassett |
| 10,476,896 B2 | 11/2019 | DiValentin et al. |
| 10,630,716 B1 | 4/2020 | Ghosh et al. |
| 10,657,461 B2 | 5/2020 | McMahan et al. |
| 10,848,515 B1 | 11/2020 | Pokhrel et al. |
| 2015/0193695 A1 | 7/2015 | Cruz Mota et al. |
| 2018/0159890 A1* | 6/2018 | Warnick .............. H04L 63/1433 |
| 2019/0005195 A1* | 1/2019 | Peterson ................ G16H 10/60 |

(Continued)

FOREIGN PATENT DOCUMENTS

| | | |
|---|---|---|
| WO | 2020/219157 | 10/2020 |
| WO | 2021/080577 | 4/2021 |

OTHER PUBLICATIONS

A Markov Game Theoritic Approach for Power Grid Security. Gael Kamdem, Charles Kamhoua, Yue Lu, Sachin Shetty. 2017 IEEE 37th International Conference on Distributed Computing Systems Workshops. pp. 139-144.*

(Continued)

*Primary Examiner* — David R Lazaro
*Assistant Examiner* — Berhanu Shitayewoldetadik
(74) *Attorney, Agent, or Firm* — Merchant & Gould P.C.

(57) ABSTRACT

Methods, systems and computer program products are provided for integrating risk and threat intelligence from various sources, to provide real-time awareness of potential threats to a computer network, which are now described herein in terms of an example enterprise system.

15 Claims, 6 Drawing Sheets

(56) References Cited

U.S. PATENT DOCUMENTS

| | | | | |
|---|---|---|---|---|
| 2019/0061147 | A1* | 2/2019 | Luciw | G06N 3/082 |
| 2019/0222593 | A1* | 7/2019 | Craig | G06N 20/20 |
| 2019/0385051 | A1* | 12/2019 | Wabgaonkar | G06N 3/084 |
| 2020/0145441 | A1* | 5/2020 | Patterson | G06F 16/9024 |
| 2020/0412767 | A1 | 12/2020 | Crabtree | |
| 2021/0019325 | A1* | 1/2021 | Edge | G06F 16/254 |
| 2021/0021629 | A1 | 1/2021 | Dani | |
| 2021/0042471 | A1* | 2/2021 | Ponomarev | G06F 40/30 |
| 2021/0234882 | A1 | 7/2021 | Lee | |
| 2022/0014561 | A1* | 1/2022 | Caceres | G06F 16/951 |
| 2022/0201014 | A1 | 6/2022 | Saha | |
| 2022/0407879 | A1* | 12/2022 | Dong | G08B 23/00 |
| 2023/0032249 | A1 | 2/2023 | Irving | |
| 2023/0056706 | A1 | 2/2023 | Irving | |
| 2023/0208882 | A1* | 6/2023 | Crabtree | G06F 21/577 726/22 |
| 2023/0328094 | A1* | 10/2023 | Brown | H04L 63/1433 726/23 |

OTHER PUBLICATIONS

PCT International Search Report and Written Opinion in Application PCT/US2022/038829, mailed Nov. 28, 2022, 18 pages.

Zhang, Lei et al., "Discover the Hidden Attack Path in Multi-Domain Cyberspace Based on Reinforcement Learning", arXiv:2104.07195v1 [cs.CR], Apr. 15, 2021, 12 pages.

Alavizadeh, Hooman et al., "A Markov Game Model for AI-Based Cyber Security Attack Mitigation", arxiv.org, Cornell University Library, Jul. 20, 2021, 11 pages.

He, Chaoyang et al., "FedGraphNN: A Federated Learning System and Benchmark for Graph Neural Networks", arxiv.org, Cornell University Library, Apr. 14, 2021, 19 pages.

McMahen, H. Brendan et al., "Communication-Efficient Learning of Deep Networks from Decentralized Data", Feb. 28, 2017, https://arxiv.org/pdf/1602.05629.pdf, retrieved on Jan. 7, 2019, 11 pages.

PCT International Search Report and Written Opinion in Application PCT/US2022/038845, mailed Oct. 25, 2022, 19 pages.

PCT International Search Report and Written Opinion in Application PCT/US2022/038863, mailed Oct. 27, 2022, 18 pages.

Yang, Qiang et al., "Federated Learning", IEEE, Dec. 31, 2020, https://ieeexplore.ieee.org/abstract/document/8940936, retrieved on Dec. 31, 2020, 202 pages.

PCT International Preliminary Report on Patentability in Application PCT/US2022/038829, mailed Feb. 8, 2024, 10 pages.

PCT International Preliminary Report on Patentability in Application PCT/US2022/038845, mailed Feb. 8, 2024, 12 pages.

PCT International Preliminary Report on Patentability in Application PCT/US2022/038863, mailed Feb. 29, 2024, 10 pages.

* cited by examiner

SYSTEMS AND METHODS FOR APPLYING REINFORCEMENT LEARNING TO CYBERSECURITY GRAPHS

CROSS REFERENCE TO RELATED APPLICATION

This application claims priority to, and the benefit of, U.S. Provisional Patent Application Ser. No. 63/227,963, filed Jul. 30, 2021, which is hereby incorporated by reference in its entirety.

TECHNICAL FIELD

Example aspects described herein relate generally to network security, and more particularly to the field of cybersecurity and threat analytics and prevention.

BACKGROUND

It is commonly known that computing assets within a computer network can be susceptible to data breaches or attacks based on malicious users gaining unauthorized access to one or more assets within the network. In such computer networks, a vulnerability can be defined as a vulnerability in software, hardware, firmware, etc. that can be exploited to gain access to certain resources. Typically, the management of vulnerabilities includes the practice of identifying and classifying vulnerabilities within the network and removing them. Such vulnerabilities, however, can be relatively difficult to categorize and mitigate and do not account for all threats to computer networks. Risks also come from technical failures, process breakdowns, and sloppy information (IT) practices anywhere within a computer network. Understanding the true risk state of a computer network (e.g., an enterprise) is just as important, and arguably more important, than just counting and tracking individual vulnerabilities.

What is needed is a mechanism that can quickly determine which assets in the computer network present the greatest threat to other assets in the network (or the entire network with an appropriate, programmatic definition of targets). This would enable a rapid response to emergent vulnerabilities thereby mitigating the potential damage done in the event of an attack. Such a search process can not only save time in determining the dangers present in the network, but also save resources which would otherwise be spent in managing the fallout from an attack.

SUMMARY

The example embodiments described herein meet the above-identified needs by providing methods, systems and computer program products for applying reinforcement learning with navigational constraints to a cybersecurity graph to determine whether available resources of at least one node on the cybersecurity graph can used by an attacker to traverse across the cybersecurity graph.

In one aspect of the disclosure, a method directed to cybersecurity may involve: receiving, from a graph database, a graph representing a digital network of a plurality of nodes, the graph including at least one vulnerability for each of the plurality of nodes; receiving, from an embeddings generator, for the plurality of nodes, a plurality of embeddings based on the graph; assigning, by an environment manager, an agent an initial node from the plurality of nodes; querying, from the environment manager, the graph to obtain a plurality of accessible nodes and at least one vulnerability for the accessible nodes; determining, by the environment manager, a transition for the agent to take from the initial node to a next accessible node from the plurality of accessible nodes; computing, by the environment manager, a reward for moving to the next accessible node; and assigning, by the environment manager, the agent a new state corresponding to the next accessible node.

In some embodiments, the method may also involve collecting, by a collected experience database, a history of node assignments of the agent, a plurality of connections taken by the agent, and a plurality of rewards the agent received for transitioning across the plurality of connections; and updating a plurality of parameters of a neural network.

Some embodiments may also involve determining, by the environment manager, from the plurality of nodes on the graph at least one node having a vulnerability score relatively higher than a plurality of vulnerability scores of other nodes in the graph.

The method may also involve detecting, by the environment manager, an exploit in the graph; and severing a node in the graph to inhibit the exploit, thereby breaking an attack path.

In some embodiments, the method may also involve determining, by the environment manager, a starting point in the graph that can be exploited to gain access to another node in the graph.

In another aspect of the present disclosure there is provided a non-transitory computer-readable medium having stored thereon sequences of instructions, the sequences of instructions including instructions which when executed by a computer system causes the computer system to: receive a graph representing a digital network of a plurality of nodes, the graph including at least one vulnerability for each of the plurality of nodes; receive for the plurality of nodes, a plurality of embeddings based on the graph; assign an agent an initial node from the plurality of nodes; querying the graph to obtain a plurality of accessible nodes and at least one vulnerability for the accessible nodes; determine a transition for the agent to take from the initial node to a next accessible node from the plurality of accessible nodes; compute a reward for moving to the next accessible node; and assign the agent a new state corresponding to the next accessible node.

In some embodiments, the instructions may further cause the one or more processors to: collect a history of node assignments of the agent, a plurality of connections taken by the agent, and a plurality of rewards the agent received for transitioning across the plurality of connections; and update a plurality of parameters of a neural network.

In some embodiments, the instructions may further cause the one or more processors to determine from the plurality of nodes on the graph at least one node having a vulnerability score relatively higher than a plurality of vulnerability scores of other nodes in the graph.

In some embodiments, the instructions may further cause the one or more processors to: detect an exploit in the graph; and severe a node in the graph to inhibit the exploit, thereby breaking an attack path.

In some embodiments, the instructions may further cause the one or more processors to determine a starting point in the graph that can be exploited to gain access to another node in the graph.

In another aspect of the present disclosure, there is provided a cybersecurity system. The cybersecurity system, in some embodiments, comprises an environment manager configured to: assign an agent an initial node from a plurality of nodes; query a graph to obtain a plurality of accessible nodes and at least one vulnerability for two or more accessible nodes; determine a transition for the agent to take from the initial node to a next accessible node from the plurality of accessible nodes; compute a reward for moving to the next accessible node; and assign the agent a new state corresponding to the next accessible node.

In some embodiments, the cybersecurity system comprises a graph database configured to store a graph representing a digital network of a plurality of nodes, the graph including at least one vulnerability for each of the plurality of nodes; and an embeddings generator configured to generate, for the plurality of nodes, a plurality of embeddings based on the graph.

In some embodiments, the cybersecurity system further comprises a collected experience database configured to collect a history of node assignments of the agent, a plurality of connections taken by the agent, and a plurality of rewards the agent received for transitioning across the plurality of connections, where the environment manager is further configured to update a plurality of parameters of a neural network.

In some embodiments, the cybersecurity system the environment manager is further configured to determine, from the plurality of nodes on the graph, at least one node having a vulnerability score relatively higher than a plurality of vulnerability scores of other nodes in the graph.

In some embodiments, of the cybersecurity system the environment manager is further configured to: detect an exploit in the graph, and sever a node in the graph to inhibit the exploit, thereby breaking an attack path.

In some embodiments, of the cybersecurity system the environment manager is further configured to: determine a starting point in the graph that can be exploited to gain access to another node in the graph.

In some embodiments, the embeddings include a vector of real numbers representing the nodes in the graph. In some embodiments, determining the transition for the agent to take is based on the graph. In some embodiments, determining the transition for the agent to take is based on the embeddings of a plurality of connections between the initial node and the plurality of accessible nodes.

These and other aspects and embodiments are described in greater detail below, in reference to the attached drawing figures

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

Generally, the example embodiments presented herein are directed to methods, systems and computer program products for integrating risk and threat intelligence from various sources to provide real-time awareness of potential threats to a computer network, which are now described herein in terms of an example enterprise system. This description is not intended to limit the application of the example embodiments presented herein. In fact, after reading the following description, it will be apparent to one skilled in the relevant art(s) how to implement the following example embodiments in alternative embodiments, e.g., involving any environment in which assets within the environment can be compromised.

Risk conditions presented in an environment are revealed to enable finding, understanding, evaluating, and prioritizing risks. Potential attack paths within the environment are evaluated, highlighting which actions can be taken to mitigate the greatest risk(s). This is accomplished by using artificial intelligence and machine learning to detect non-obvious conditions in data sets.

A graph as used herein is a mathematical structure used to model pairwise relations between objects. Points are represented as nodes (also referred to sometimes as vertices) that are linked by edges (also referred to sometimes as links). A starting point within the graph is a point within a graph on which an agent commences seeking nodes (including the node that is the starting point) that can be compromised for the purpose of locating resources of any node that can be used to penetrate further within the network and access valuable resources. As used herein, a node can represent any type of datapoint associated with a network, technology or organization. An example of a node includes a device, a server, a database, a user, a user group, a network (wired, wireless, etc.), a directory service (e.g., Active Directory), resource, or any other datapoint, system, device or component that can be associated with a network or organization.

Federated learning (also known as collaborative learning) is a machine learning technique that trains an algorithm across multiple decentralized edge devices or servers holding local data samples, without exchanging them. Federated learning enables multiple actors to build a common, robust machine learning model without sharing data, thus allowing to address critical issues such as data privacy, data security, data access rights and access to heterogeneous data. Federated learning also enables training of a high-quality centralized model based on training data distributed over a large number of client computing devices. A federated learning model is a model that learns while not sharing contributor data. In some embodiments described herein, nodes within a graph are coupled to each other to form a so-called federated learning network. In the federated learning network, node devices can perform separate training of customized machine learning models and then send their local updates (e.g., model gradients or model parameters, each referred to herein as a parameter vector) to a trusted server. The trusted server, in turn, aggregates these updates to compute global updates. This enables the nodes on the graph (e.g., edge devices) to collaboratively learn a shared prediction model while keeping the training data on a corresponding node, decoupling the ability to perform machine learning from the need to store the data in, for example, the cloud.

Reinforcement learning as used herein is the training of machine learning models to make a sequence of decisions. An agent (also referred to as a software agent) learns to achieve a goal in an uncertain, potentially complex environment. In reinforcement learning, an artificial intelligence faces a game-like situation. A machine employs trial and error to come up with a solution to the problem. To get the machine to do what the programmer wants, the artificial intelligence gets either rewards or penalties for the actions it performs. Its goal is to maximize the total reward.

Pathfinding or pathing as used herein is the plotting, by a computer application, of a route between two points.

Figure 1:
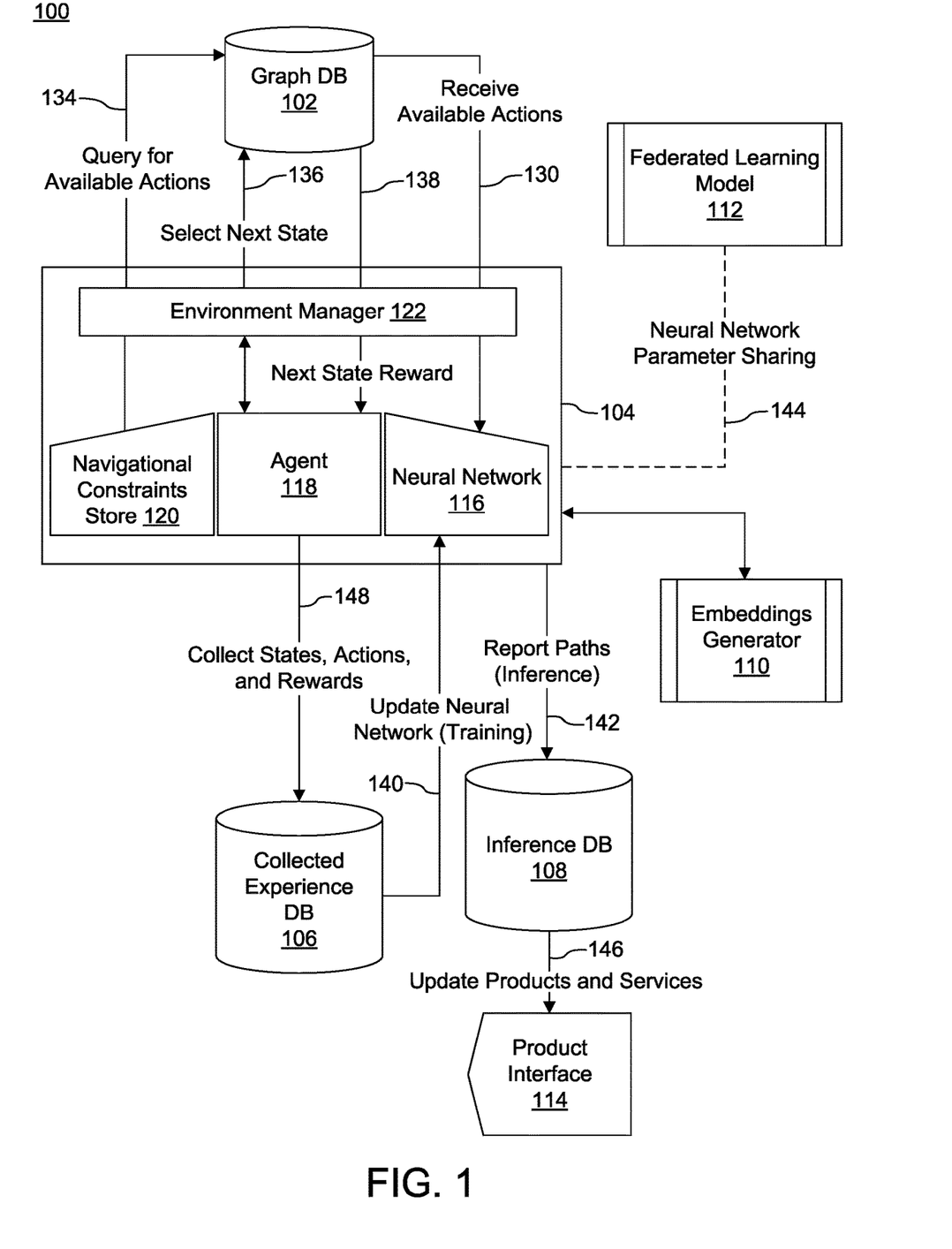
FIG. 1 illustrates an example system for performing attack path analysis and prevention.

FIG. 1 illustrates an example attack path analysis and prevention system 100 for performing attack path analysis and prevention. The system includes a graph database 102, an agent server 104, a collected experience database 106, an inference database 108, an embeddings generator 110, a federated learning model 112, and a product interface 114. Agent server 104 includes a neural network 116, an agent 118, a navigational constraints store 120, and an environment manager 122.

Agent 118 mediates through environment manager 122 with a set of navigational constraints in navigational constraints store 120 and neural network 116. Agent 118 receives its first state from the environment manager 122. Environment manager 122 obtains the first state by querying the graph database 102 for available actions, as shown in operation 134. Agent 118 receives from graph database 102 the available actions it can take, as shown in operation 130. Agent 118 then determines from the information it has about the first state and, using the neural network 116 along with the navigational constraints stored in navigational constraints store 120, determines a decision as to what action from the available actions it will take next. In operation 136, the agent 118 selects the next state. In turn, the next state reward that results from agent 118 being in the next state is fed back to the agent 118, as shown in operation 138. This will repeat until the agent 118 arrives at a terminal state. At that time, agent 118 deposits its experience that it collected in that episode (e.g., states, actions and rewards) into a collected experience database 106 as shown in operation 148 or in inference database 108 as shown in operation 142. The data that has been stored in collected experience database 106 is used to update the neural network 116 for training purposes, as shown in operation 140, and the data that is deposited to inference database 108, as shown in operation 142, can be used by other products and services (not shown) via product interface 114. A product can retrieves data from inference database 108 via product interface 114, as shown in operation 146.

In some embodiments described herein, nodes within a graph are coupled to each to form federated learning network having associated with it a federated learning model 112. In an example embodiment, federated learning model 112 and neural network 116 share parameters, as shown in operation 144.

In an example embodiment, given a graph representing a digital network of nodes (e.g., assets such as devices) and including data representing network and/or node configurations, a set of paths are obtained within the graph with one endpoint at a node (e.g., a device) chosen from a list of targets and the other endpoint at a node (e.g., a device) which is known to have a vulnerability (e.g., vulnerable software) which enables a malicious actor to access the node (e.g., device). The paths are further required to be comprised of segments which define the order in which nodes and edges must appear along the path.

This use case is one example of so-called constrained pathfinding: the process of finding a set of contiguous nodes and edges conforming to a pre-determined set of constraints. These constraints can include:

a set of nodes for each endpoint of the path, and
a set of segments defining the path structure.

In a network example the endpoint constraints may be satisfied by manual selection of targets, vulnerable devices, and path segments. Any of these may be supplanted by programmatic analysis of the network, including the application of machine learning models such as linear regressors or neural networks.

With defined constraints the process according to an example embodiment follows a deep reinforcement learning (RL) paradigm. In an example embodiment, the RL policy is represented by a machine learning model (e.g., a convolutional neural network). The RL agent is a process which applies the policy model to a numerical representation of each target and uses the results to determine which, if any, path segment is best traversed in its effort to find a valid path. Recursive application of the policy model on the successor state (arrived at after choosing a segment based on the policy) continues until an endpoint state is achieved.

Typical pathfinding mechanisms seek only the shortest path between two nodes rather than RL to intelligently navigate a graph, which may not necessarily be the shortest path. Example embodiments described herein use deep learning that uses a stochastic model (e.g., instead of a deterministic policy) to predict a reward from the current position of an agent.

Example embodiments described herein can determine which nodes (e.g., devices) present the greatest threat to valuable devices in a network (or the entire network with an appropriate, programmatic definition of targets) in a short amount of time (e.g., minutes). This enables rapid response to emergent vulnerabilities thereby mitigating the potential damage done in the event of an attack.

A more detailed analysis is provided by labelling the nodes with a set of available actions for the agent 118 to undertake. These actions, in the network example, may represent specific vulnerabilities on a target node (e.g., device) or classes of vulnerabilities commonly exploited during certain types of attacks (e.g., ransomware). By using neural networks to analyze the available actions, the agent 118 can efficiently choose an optimum action from a large, discrete set.

Figure 2:
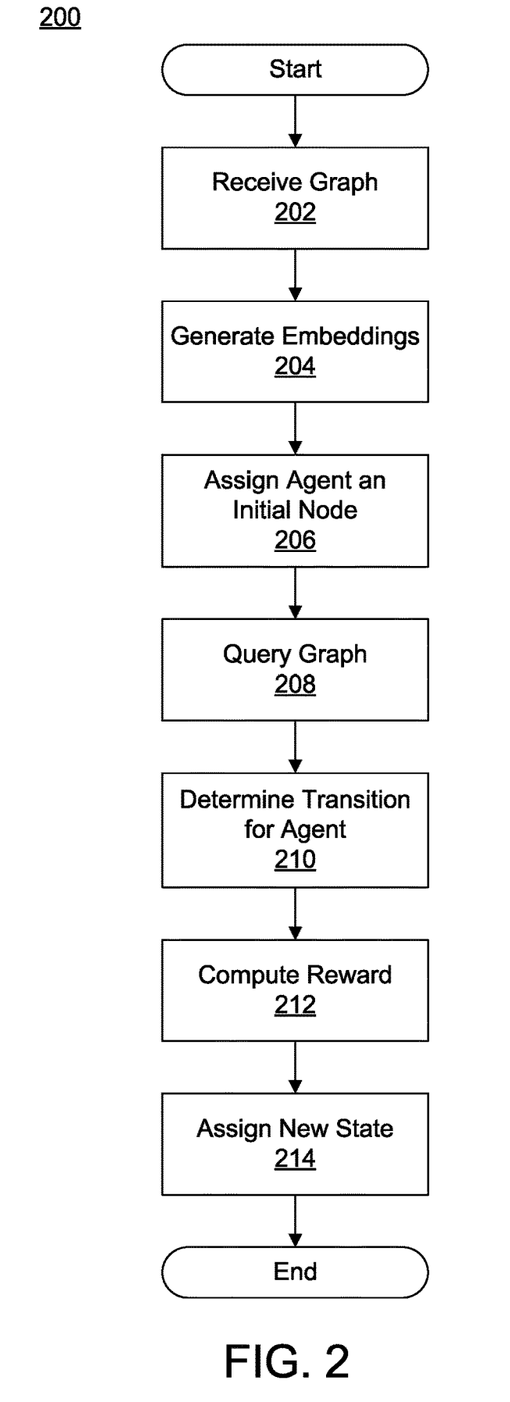
FIG. 2 depicts a cybersecurity method according to an example embodiment.

FIG. 2 depicts a cybersecurity method 200 according to an example embodiment. A graph receiving operation 202, performs receiving a graph representing a digital network of a plurality of nodes. The graph includes at least one vulnerability for each of the plurality of nodes. An embeddings generation operation 204 performs generating, for the plurality of nodes, a plurality of embeddings based on the graph. In turn, an agent assigning operation 206 performs assigning an agent 118 an initial node from the plurality of nodes.

Referring also to FIG. 1, the agent 118 is equipped with a set of navigational constraints obtained from a navigational constraints store 120. A navigational constraint is a rule corresponding to how the agent 118 can move throughout a graph. As the agent 118 moves throughout the graph, agent 118 detects devices along its path and collects information on the detected devices. Agent 118 determines from the information what actions it can take to get to each device in the set of devices. In an example implementation, there is a common connection between the device the agent is currently on and the other devices in the set of devices.

At least some of the set of devices have vulnerabilities. A vulnerability is a weakness or flaw in software, hardware, or organizational processes, which when compromised by a threat, can result in a security breach. Nonphysical network vulnerabilities typically involve software or data. The agent 118 uses the graph to determine the devices it can move to within the graph and to retrieve all the vulnerabilities on the devices on which it passes. With this information, agent 118 can consider the moves it will need to take to get to the devices and also the vulnerabilities available on the devices by feeding the information to the neural network 116.

The information about each device in the set of the devices (e.g., its vulnerabilities) and the plurality of embeddings generated by embeddings generator 110 are communicated to a neural network the agent is equipped with. The neural network 116 provides the agent 118 a prediction as to which action is optimal for it to take. When the agent 118 takes an action it can use the graph and the neural network 116 to determine which device it will arrive at next and how valuable that device is. Vulnerabilities on each of the other devices and the connections that join the agent 118 to the next device are used to predict how it should move to another device.

In some embodiments, a determination is made whether to deposit the data that has been collected in a collected experience database 106 to update the neural network 116 or to deposit the data that has been collected in inference database 108 to be collected by other products and services (not shown), as shown by operation 142. The data collected by inference database 108 is collected by a product or service via product interface 114. as shown by operation 146.

In some embodiments, the agent represents an attacker. The agent is given an initial state to start at. The initial state can represent a particular device on the network that is the starting point for the agent. The agent uses the navigational constraints to query the graph to obtain a list of other devices it is connected to and their vulnerabilities that it can take advantage of.

Referring again to FIG. 2, a graph query operation 208 queries the graph to obtain a plurality of accessible nodes and at least one vulnerability for the accessible nodes. In some embodiments, the embeddings of the device the agent 118 is currently located as well as the connections between the current device and the successor devices the agent 118 can transition to.

A transition operation 210 performs determining which transition the agent will take from the initial node to a next accessible node from the plurality of accessible nodes. In some embodiments, the determination is based on the graph. In some embodiments, the determining is based on the embeddings of a plurality of connections between the initial node and the plurality of accessible nodes.

A reward computing operation 212 performs computing a reward for moving to the next accessible node. In turn, an agent assignment operation 214 performs assigning the agent a new state corresponding to the next accessible node.

The agent 118 receives the reward for moving to the next accessible node and the next state, thereby placing the agent in a new initial state. The above process can then be repeated.

Advantageously, the agent is making decisions and growing more informed as it makes those decisions. But unlike traditional reinforcement learning architectures, the architecture presented herein involves pathfinding within a graph. In some embodiments, the embeddings include a vector of real numbers representing the nodes in the graph. In some embodiments, determining the transition for the agent to take is based on the embeddings of a plurality of connections between the initial node and the plurality of accessible nodes.

In some embodiments, a history of node assignments of the agent, a plurality of connections taken by the agent, and a plurality of rewards the agent received for transitioning across the plurality of connections can be collected. The plurality of parameters of a neural network can be updated with this information.

In an example implementation, the neural network is a convolutional neural network.

In some embodiments, a determination is made from the plurality of nodes on the graph at least one node having a vulnerability score relatively higher than a plurality of vulnerability scores of other nodes in the graph.

In some embodiments, an exploit in the graph is detected. Upon detection a node in the graph can be severed to inhibit the exploit, thereby breaking an attack path. A starting point in the graph that can be exploited to gain access to another node in the graph can also be detected.

Figure 3:
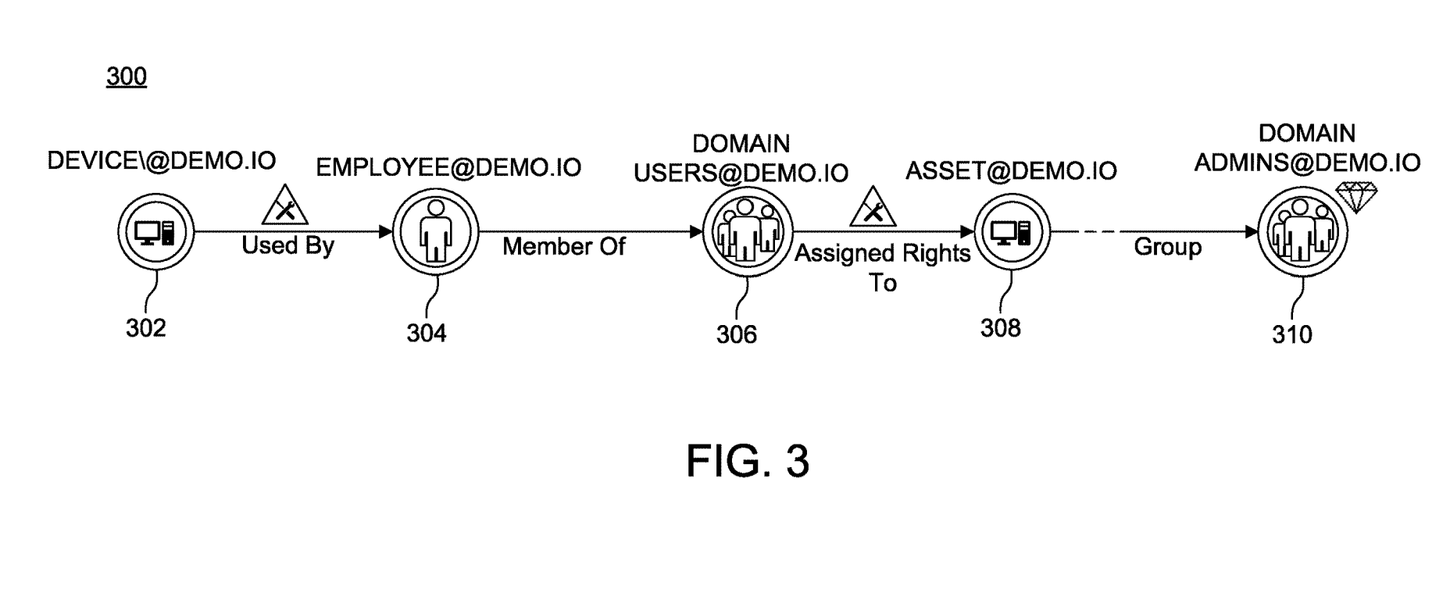
FIG. 3 shows an illustrative output of an interface representing an example attack path that leads from a node with vulnerabilities to a high value asset.

FIG. 3 depicts an illustrative output of an interface representing an example attack path that leads from a node 302 with vulnerabilities (e.g., an individual device) to a high value asset, node 310, (e.g., a domain administrator). In this example, the attack path leads from the node with vulnerabilities (e.g., node 302) that is a device used by an employee, node 304, which is a member of a domain, node 306. Domain (node 306) is assigned rights to another asset within the network, node 308, (e.g., a database) which in turn is connected to a high value asset, node 310, which in this example is an administrative domain asset, which if attacked or breached can lead to significant breach of an enterprise (e.g., by allowing an attacker to control various resources within the enterprise). It should be understood that other types of assets such as additional hardware devices, access by individuals, networks, groups, active directory permission, cloud resources, or other type of node, may be within the attack path. For example, an asset (e.g., a group) may be nested within another group, which is assigned, for example admin rights to a device. Any node (e.g., representing an asset) within the attack path can be a source for a foothold by an attacker.

Aspects of the present invention seeks where an attacker can establish a foothold that allows an attacker to commence an attack on, for example, email servers, databases, computers, resources, among other assets. By virtue of the features described herein, advanced notification of such potential footholds is provided to prevent an attacker from establishing a foothold by installing a persistent backdoor or downloading additional utilities or malware to the victim system through the exploit of a vulnerability of an asset within the network.

Vulnerabilities can be determined using now known or future developed tools designed to scan for vulnerabilities, for example by connecting to a device or a network, or by installing a vulnerability scanning agent on the device or network that seeks vulnerabilities in, for example, device or network configurations, software, and characteristics thereof.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

Figure 4:
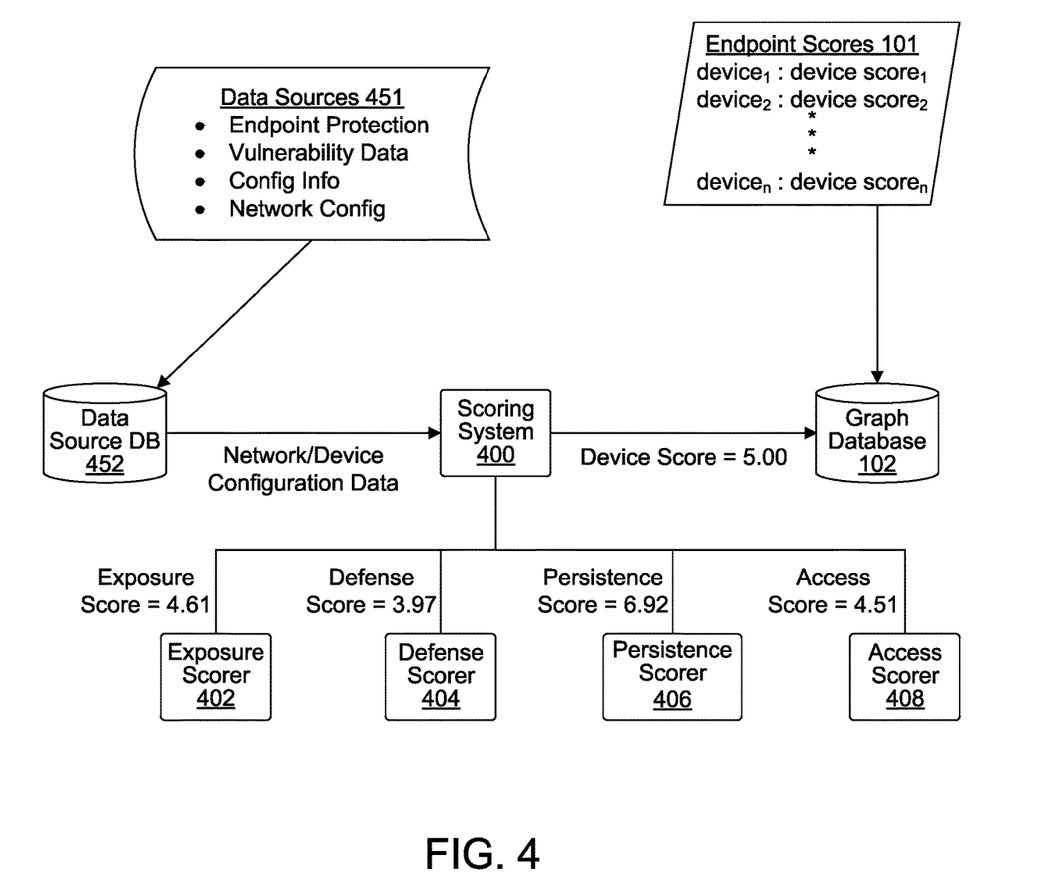
FIG. 4 illustrates a scoring system for data associated with an endpoint in accordance with an example embodiment.

FIG. 4 illustrates a scoring system 400 for scoring data associated with an endpoint according to an example embodiment. Scoring system 400 uses data from one or more data sources 451 to generate endpoint scores 101, where each endpoint score 101 is associated with an endpoint at a node on a graph (e.g., a device).

In some embodiments, scoring system 400 is configured to provide the graph database (e.g., graph database 102 of FIG. 1) with computed values representing the risks corresponding endpoints have of being attacked, and the potential impact associated with an attack. Generally, scoring system 400 includes a collection of subscorers which determine the specific value associate with each property of interest.

In an example implementation, one non-limiting property of interest is an exposure score, which is a measure of a how many ways an attacker may access an endpoint (e.g., a device). Calculating the exposure score can include evaluating the number of vulnerable applications installed, availability of internet access, and number of peers on the local network.

Another non-limiting property can be a defense score, which is a measure of an endpoint's (e.g., a devices) ability to respond to an attack. Calculating a defense score can include determining the presence and configuration of anti-virus and/or endpoint protection software, evaluating network configurations, monitoring operating system (OS) logging, and determining the presence and timeliness of backups.

Another non-limiting property can be a persistence score, which is a measure of an endpoint's (e.g., device's) susceptibility to detecting malfeasance in the long-term. Calculating a persistence score can involve performing a subjective evaluation of the device and its configurations.

Another non-limiting property can be an access score. An access score is a measure of an endpoint's (e.g., a device's) connectedness to other assets in the network. Calculating an access score can includes evaluating a number of peers on a local network and tactics available to an attacker on those peers.

In some embodiments, the data received from the data sources 451 includes: endpoint protection data, vulnerability data, configuration information and network configuration data. The data (also referred to as refined data), in some embodiments, is collected in a data source database 452. In an example implementation, the data from data sources 451 contains datapoints that represent an algorithmic factor (e.g., is the endpoint in an alert-only mode, is the endpoint in a blocking-mode, is the endpoint associated with one or more particular policies, etc.).

In some embodiments, the data sources 451 contain network integration data such as logical data and physical data. In some embodiments, the data sources 451 contain endpoint (e.g., device) state data such as whether an endpoint has a patch agent, an endpoint protection agent, or whether the endpoint has been scanned by a vulnerability scanner to detect vulnerabilities in the endpoint. In some embodiments, the data sources 451 contain identity data such as authentication data.

In an example implementation, the data received from the data sources 451 is structured in a uniform manner. In an example implementation, the data is structured as a standard text-based format for representing structured data, such as JavaScript Object Notation (JSON) is which is based on JavaScript object syntax. The components of the JSON, in turn, can be broken down into respective datasets, such as endpoint data (e.g., a source IP address, a source hostname, a source port, the destination IP address, a destination hostname, a destination port, a protocol generated for the netflow data in operation, and the like), network data (e.g., information such as the number of nodes and the existence or absence of links between the them), and identity data (e.g., information such as users and all connected devices they use or data representative of a component configuration of an endpoint, including the device identity representative of a memory device and other components). In turn, the datasets can be stored in respective databases, represented collectively in FIG. 4 as data source database 452.

The scoring system 400 includes subcomponents that generate subscores from the data stored in data source database 452. In some embodiments, the scoring system 400 includes plural subscorers. In some embodiments, the plural subscorers include an exposure scorer 402, a defense scorer 404, a persistence scorer 406, and an access scorer 408. The algorithmic factor is a numerical value that factors into a device score calculated by the endpoint scorer.

The endpoint score (also referred to as a device score) is, in turn, stored in graph database 102 together with a corresponding graph. In an example implementation, the data is stored in a database as tuples e.g., (device$_1$: device score$_1$, device$_2$: device score$_2$, . . . , device$_n$: device score$_m$).

In some embodiments, the exposure scorer 402 is configured to generate an exposure score representing an exposure (i.e., an attack surface) of a network. The defense scorer 404, in some embodiments, is configured to generate a defense score representing how well a defensive posture of a network (i.e., how well the network can defend itself).

The persistence scorer 406 is configured to generate a persistence score representing how good is a particular node at repelling an adversarial agent. An adversarial agent, as used herein, is a computer program that operates to exploit a weakness of a network.

As described above, access scorer 408 is configured to generate an access score representing an extent to which a particular node (e.g., device, service, application, etc.) is exposed to a network. In an example implementation, the exposure score, the defense score, the persistence score and the exposure score for a particular endpoint are combined to generate the endpoint score (also referred to as a device score). The calculation used to calculate the endpoint score can be tailored to the risk tolerance for a particular network. That is the scoring system 400 can contain processors that calculate an endpoint score based on a predetermined algorithm.

In an example embodiment, the scoring system 400 can involve aggregating the sub-scores into a single endpoint score.

In the example embodiment illustrated in FIG. 4, the exposure scorer is configured to outputs an exposure score (e.g., 4.61), the defense scorer 404 is configured to output a defense score (e.g., 3.97), the persistence scorer 406 is configured to generate a persistence score (e.g., 6.92), and the access scorer 408 is configured generate an access score (e.g., 4.51). In this embodiment, the scoring system is configured to average the exposure score, the defense score, the persistence score, and the access score. (e.g., [exposure score+defense score+persistence score+access score]/4=5.00).

However, it should be understood that different calculations can be applied to the scores. For example, each score may be weighted by, for example multiplying each score to its corresponding weight. That is, the endpoint score can be calculated by using a linear model as shown in equation 1, as follows:

$$D = \Sigma_i w_i x_i \qquad (1)$$

where the $w_i$ are weights corresponding to the sub-scores $x_i$. In an example implementation, all scores can be normalized to the range [0,10].

Other factors may be taken into consideration and still be within the scope of the embodiments described herein. In addition, additional factors may be computed using the data stored in data source DB 452 or other data external to the data stored in data source database 452.

The endpoint score is stored in graph database 102 together with a corresponding graph.

Figure 5:
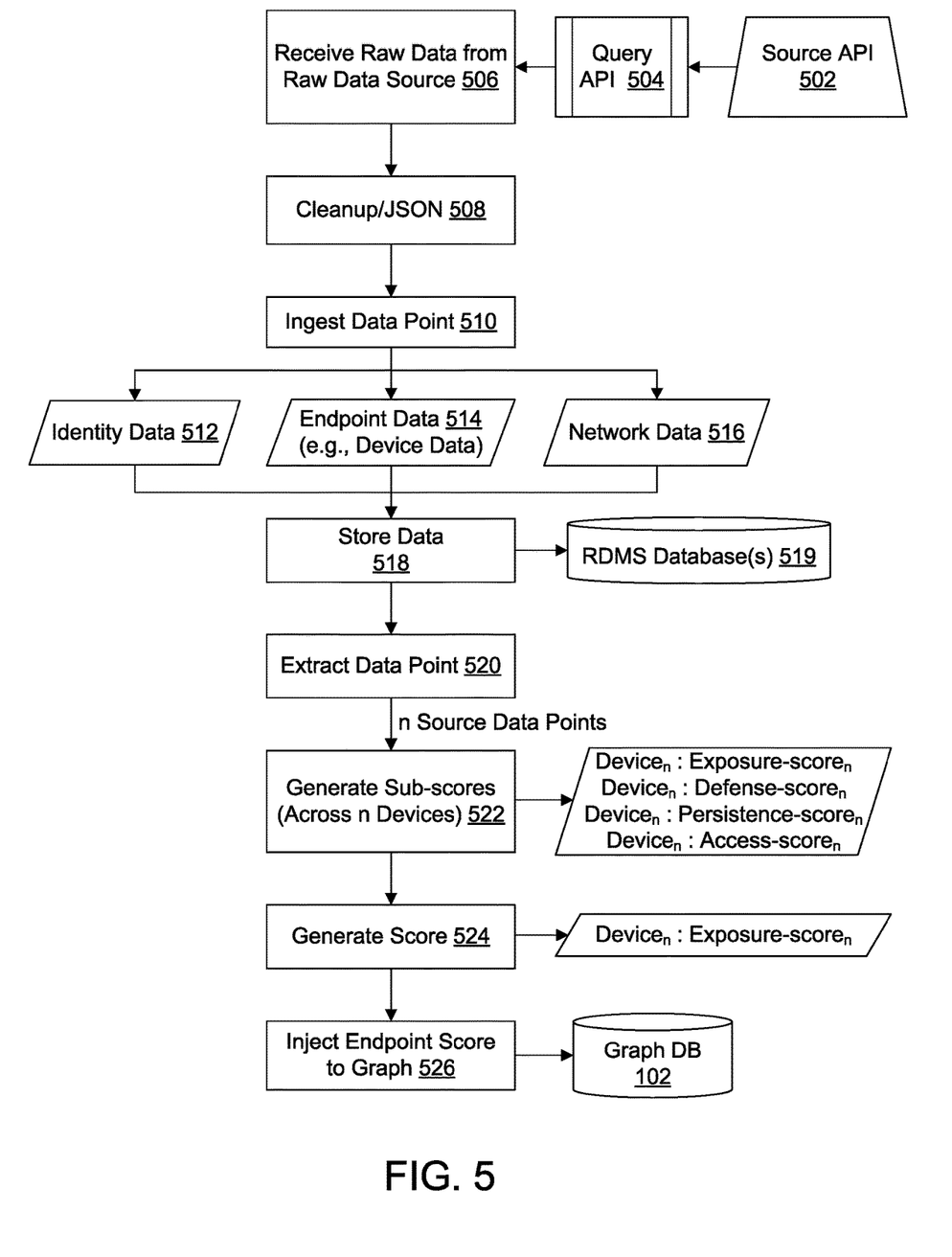
FIG. 5 illustrates a scoring procedure according to an example embodiment.

FIG. 5 illustrates a scoring procedure 500 according to an example embodiment. Generally, scoring procedure 500 operates to score data associated with an endpoint according to an example embodiment. Data from one or more data sources is used to generate endpoint scores, where each endpoint score is associated with an endpoint at a node on a graph (e.g., a device), as illustrated by device$_n$: exposure-score$_n$.

In the example embodiment, a raw data receiving operation 506 performs receiving raw data from a data source. In some embodiments, the raw data receiving operation 506 is performed by a querying operation 504 that queries a data source via, for example, a source application programming interface (API) 502 and instance of which is provided by source of the raw data.

A data formatting operation 508 performs structuring on the data to structure the data from a raw format in a uniform manner to generate a structured dataset. As described above, in an example implementation, the data is structured as a standard text-based format for representing structured data, such as JavaScript Object Notation (JSON) is which is based on JavaScript object syntax. An input data point ingestion operation 510 ingests the components of the JSON to obtain respective datasets, such as endpoint data 514 (e.g., a source IP address, a source hostname, a source port, the destination IP address, a destination hostname, a destination port, a protocol generated for the netflow data in operation, and the like), network data 516 (e.g., information such as the number of nodes and the existence or absence of links between the them), and identity data 512 (e.g., information such as users and all connected devices they use or data representative of a component configuration of an endpoint, including the device identity representative of a memory device and other components).

In an example implementation, the input data point ingestion operation 510 determines if the raw data received from the data sources (e.g., FIG. 4, data sources 451) contains data that matches any one of the three data schemes (i.e., identity data 512, endpoint data 514, network data 516). It should be understood that other sources of data can be used in the calculation of the endpoint score and still be within the scope of the embodiments described herein.

The input data point ingestion operation 510, in some embodiments, performs pulling data points from the data sources and correlating the data points across plural data sources. For example, with regard to identity data 512, a unique representation may be associated with a user that has authorization data points from various data sources (e.g., Amazon Web Services (AWS) cloud computing services, Microsoft Office 365, Active Directory, etc.). The input data point ingestion operation 510, in some embodiments, performs reading authorization data from the various sources and injects that data into the appropriate database. The data point reads across all the data and injected into the appropriate database to store the identity data.

In turn, a database storage operation 518 performs storing the datasets in respective databases such as in one or more relational database management systems (RDMS) 519.

A subscore generation operation 522 performs generating, from the data stored in data source database(s) 519, sub-scores for each endpoint. In an example implementation, subscore generation operation 522 performs an exposure scoring operation, a defense scoring operation, a persistence scoring operation, and an access scoring operation. An endpoint scoring operation 524 performs generating an endpoint score (also referred to as a device score).

In turn, a graph database storing operation 526 performs injecting each endpoint score into a database, such as graph database 102, together with a corresponding graph. As described above, in some embodiments, the data is stored in a database as tuples e.g., (device$_1$: device score$_1$, device$_2$: device score$_2$, . . . , device$_n$: device score$_n$).

Figure 6:
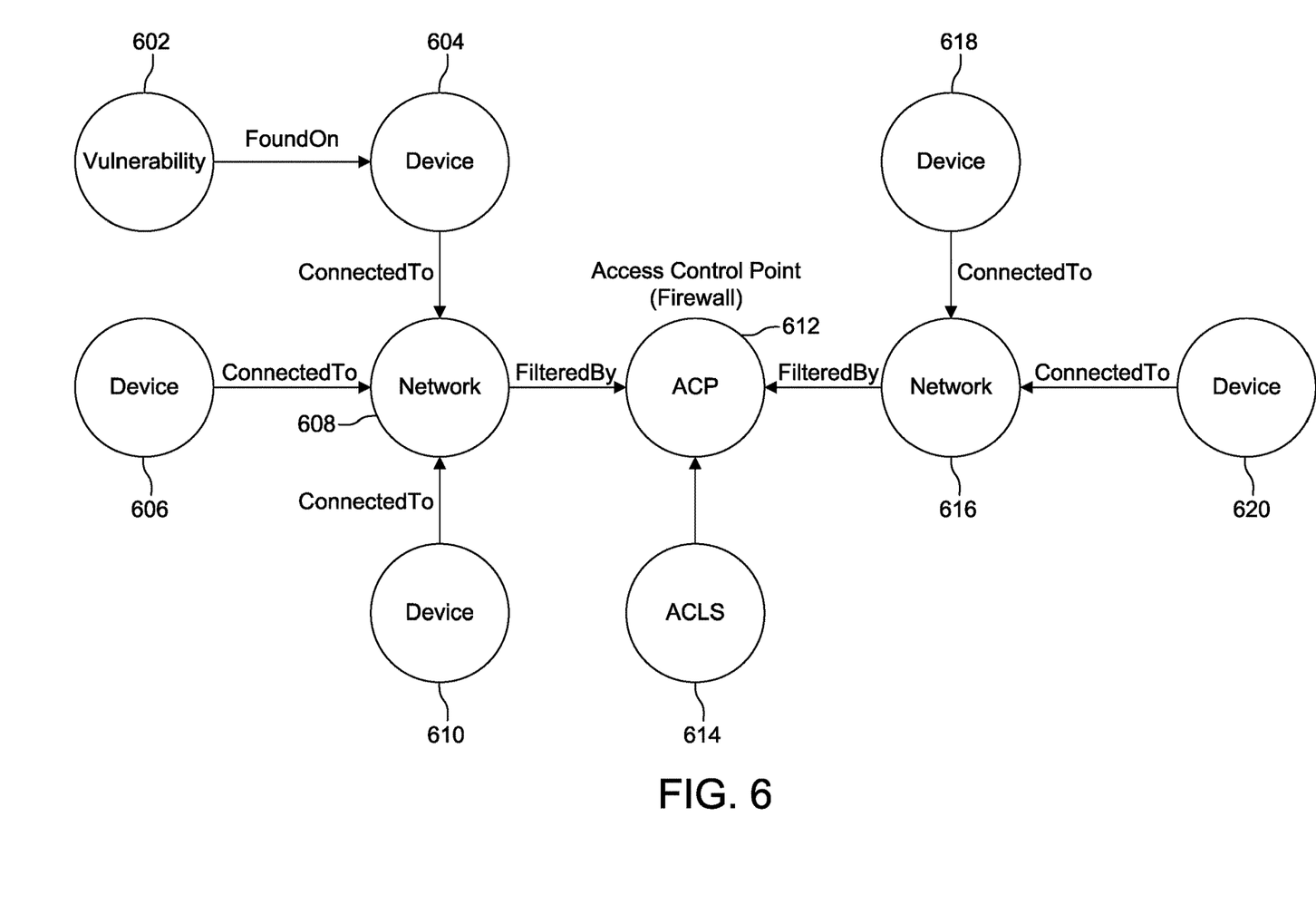
FIG. 6 shows an example graph containing refined graph data which may be input to the scoring system.

FIG. 6 shows an example graph 600 containing refined graph data which may be input to the scoring system. In this example, the graph contains data illustrating a vulnerable device 604 on a network with other devices. The ability of devices to communicate with each other is constrained by access-control lists (ACLs).

Each sub-score (e.g., exposure score, defense score, persistence score and access score) is computed for the vulnerable device 604.

Vulnerable device 604 may access or be accessed by the other devices on the network through network 608. The other devices on the network include device 606 and device 610 that are connected to network 608 and other devices, device 618 and device 720 that are connected to network 616 and via an Access Control Point (ACP) 612 and as constrained by the access control lists (ACLs) 614. The sub-scores in FIG. 4 are computed by the sub-scorers (e.g., exposure scorer 402, defense scorer 404, persistence scorer 406 and access scorer 408) which process the structure of the graph shown in FIG. 6, as well as the properties of the nodes therein.

It should be understood that the sub-scorers, exposure scorer 402, defense scorer 404, persistence scorer 406, and/or access scorer 408 can be configured to generate sub-scores based on corresponding predetermined algorithms. Accordingly, it should be understood that the examples described herein with respect to the sub-scorers are exemplary and not limiting.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random access memory, for temporary data and program instruction storage. From a software standpoint, a CPU typically includes software resident on a storage media (e.g., a memory card), which, when executed, directs the CPU in performing transmission and reception functions. The CPU software may run on an operating system stored on the storage media, such as, for example, UNIX or Windows, iOS, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A cybersecurity method for determining exploits, comprising the steps of:
   receiving a graph representing a digital network of a plurality of nodes forming a federated learning network, the graph including at least one vulnerability for each of the plurality of nodes;
   receiving, for the plurality of nodes, a plurality of embeddings based on the graph, wherein the plurality of embeddings include a vector of real numbers representing the plurality of notes in the graph;
   assigning an agent an initial node from the plurality of nodes;
   querying the graph to obtain a plurality of accessible nodes and at least one vulnerability for the accessible nodes;
   determining a transition for the agent to take from the initial node to a next accessible node from the plurality of accessible nodes;
   computing using a neural network, a reward for moving to the next accessible node;
   assigning the agent a new state corresponding to the next accessible node;
   collecting, by a collected experience database, a history of node assignments of the agent, a plurality of connections taken by the agent, and a plurality of rewards the agent received for transitioning across the plurality of connections;
   updating a plurality of parameters of a neural network using the data collected by the collected experience database, wherein the information collected by each of a plurality of agents is used to further update the plurality of parameters of the neural network while not sharing graph data contributed by a plurality of graphs; and
   determining, by the agent, what action from a plurality of available actions to take next using the neural network.

2. The method according to claim 1, wherein determining the transition for the agent to take is based on the embeddings of a plurality of connections between the initial node and the plurality of accessible nodes.

3. The method according to claim 1, further comprising the step of:
   determining from the plurality of nodes on the graph at least one node having a vulnerability score relatively higher than a plurality of vulnerability scores of other nodes in the graph.

4. The method according to claim 1, further comprising the step of:
   detecting an exploit associated with a node in the graph representing the digital network; and
   preventing the agent from traversing the node in the digital network that is associated with the exploit and represented in the graph, thereby inhibiting the exploit.

5. The method according to claim 1, further comprising the step of:
   determining a starting point in the graph that can be exploited to gain access to another node in the graph.

6. A non-transitory computer-readable medium having stored thereon sequences of instructions, the sequences of instructions including instructions which when executed by a computer system causes the computer system to perform determining exploits by:
   receiving a graph representing a digital network of a plurality of nodes forming a federated learning network, the graph including at least one vulnerability for each of the plurality of nodes;
   receiving for the plurality of nodes, a plurality of embeddings based on the graph;
   assigning an agent an initial node from the plurality of nodes;

querying the graph to obtain a plurality of accessible nodes and at least one vulnerability for the accessible nodes, wherein the plurality of embeddings include a vector of real numbers representing the plurality of nodes in the graph;

determining a transition for the agent to take from the initial node to a next accessible node from the plurality of accessible nodes;

computing a reward for moving to the next accessible node;

assigning the agent a new state corresponding to the next accessible node;

collecting a history of node assignments of the agent, a plurality of connections taken by the agent, and a plurality of rewards the agent received for transitioning across the plurality of connections;

updating a plurality of parameters of a neural network using the data collected by the collected experience database, wherein the information collected by each of a plurality of agents is used to further update the plurality of parameters of the neural network while not sharing graph data contributed by a plurality of graphs; and determining, by the agent, what action from a plurality of available actions to take next using the neural network.

7. The non-transitory computer-readable medium according to claim 6, wherein determining the transition for the agent to take is based on the embeddings of a plurality of connections between the initial node and the plurality of accessible nodes.

8. The non-transitory computer-readable medium of claim 6, further having stored thereon a sequence of instructions for causing the one or more processors to perform:

determining from the plurality of nodes on the graph at least one node having a vulnerability score relatively higher than a plurality of vulnerability scores of other nodes in the graph.

9. The non-transitory computer-readable medium of claim 6, further having stored thereon a sequence of instructions for causing the one or more processors to perform:

detecting an exploit associated with a node in the graph representing the digital network; and preventing the agent from traversing the node in the digital network that is associated with the exploit and represented in the graph, thereby inhibiting the exploit.

10. The non-transitory computer-readable medium of claim 6, further having stored thereon a sequence of instructions for causing the one or more processors to perform:

determining a starting point in the graph that can be exploited to gain access to another node in the graph.

11. A cybersecurity system for determining exploits, comprising:

one or more processors configured to:
generate, for a plurality of nodes, a plurality of embeddings based on a graph representing a digital network of the plurality of nodes forming a federated learning network, the graph including at least one vulnerability for each of the plurality of nodes, wherein the plurality of embeddings include a vector of real numbers representing the plurality of nodes in the graph;

assign an agent an initial node from the plurality of nodes;

query the graph to obtain a plurality of accessible nodes and at least one vulnerability for two or more accessible nodes;

determine a transition for the agent to take from the initial node to a next accessible node from the plurality of accessible nodes;

compute, using a neural network, a reward for moving to the next accessible node;

assign the agent a new state corresponding to the next accessible node;

a collected experience database configured to collect a history of node assignments of the agent, a plurality of connections taken by the agent, and a plurality of rewards the agent received for transitioning across the plurality of connections;

the one or more processors further configured to update a plurality of parameters of a neural network, wherein the information collected by each of a plurality of agents is used to that further update the plurality of parameters of the neural network while not sharing graph data contributed by a plurality of graphs; and the agent further configured to determine what action from a plurality of available actions to take next using the neural network.

12. The cybersecurity system according to claim 11, wherein determining the transition for the agent to take is based on the embeddings of a plurality of connections between the initial node and the plurality of accessible nodes.

13. The cybersecurity system according to claim 11, wherein the one or more processors are further configured to determine, from the plurality of nodes on the graph, at least one node having a vulnerability score relatively higher than a plurality of vulnerability scores of other nodes in the graph.

14. The cybersecurity system according to claim 11, wherein the one or more processors are further configured to:

detect an exploit associated with a node in the graph representing the digital network; and prevent the agent from traversing the node in the digital network that is associated with the exploit and represented in the graph, thereby inhibiting the exploit.

15. The cybersecurity system according to claim 11, wherein the one or more processors are further configured to:

determine a starting point in the graph that can be exploited to gain access to another node in the graph.

* * * * *